United States Patent [19]
Denz

[11] Patent Number: 5,144,927
[45] Date of Patent: Sep. 8, 1992

[54] METHOD FOR DETECTING MISFIRES IN AN INTERNAL COMBUSTION ENGINE

[75] Inventor: Helmut Denz, Stuttgart, Fed. Rep. of Germany

[73] Assignee: Robert Bosch GmbH, Stuttgart, Fed. Rep. of Germany

[21] Appl. No.: 754,673

[22] Filed: Sep. 4, 1991

[30] Foreign Application Priority Data

Sep. 5, 1990 [DE] Fed. Rep. of Germany ....... 4028131

[51] Int. Cl.$^5$ .............................................. F02P 5/14
[52] U.S. Cl. ................................................... 123/425
[58] Field of Search ............... 123/425, 435, 417, 436, 123/416; 364/431.08; 73/35

[56] References Cited

U.S. PATENT DOCUMENTS

| | | | |
|---|---|---|---|
| 4,971,007 | 11/1990 | Gopp et al. | 123/425 |
| 5,050,556 | 9/1991 | Williams et al. | 123/425 |
| 5,054,448 | 10/1991 | Matsuoka et al. | 364/431.08 |
| 5,058,552 | 10/1991 | Shimonura et al. | 123/435 |

FOREIGN PATENT DOCUMENTS

3615547 11/1986 Fed. Rep. of Germany ...... 123/425

Primary Examiner—Raymond A. Nelli
Attorney, Agent, or Firm—Walter Ottesen

[57] ABSTRACT

The invention is directed to a method for detecting misfires in an internal combustion engine having Z cylinders. A compression angular segment and an expansion angular segment are fixed for each cylinder (i) of the Z cylinders in accordance with an initial crankshaft angle and a crankshaft angle span corresponding to this cylinder so that, with a smooth running of the engine and referred to time, a compression time span TV(i) corresponding to said compression angular segment is essentially equal to an expansion time span TE(i) corresponding to said expansion angular segment, with the compression angular segment lying within that crankshaft angle span for the cylinder (i) in which the engine speed drops because of compression occurrences and with the expansion angular segment lying within that crankshaft angle span for the cylinder (i) in which the engine speed increases because of expansion occurrences; and, deviations between compression time span and expansion time span for at least one cylinder are used to detect misfires.

10 Claims, 5 Drawing Sheets

METHOD FOR DETECTING MISFIRES IN AN INTERNAL COMBUSTION ENGINE

FIELD OF THE INVENTION

The invention relates to a method for detecting misfires in an internal combustion engine. Methods of this kind are significant especially when applied to internal combustion engines having a catalyzer mounted in the exhaust-gas channel. If misfires occur, then an uncombusted air/fuel mixture reaches the catalyzer and combusts there. This causes an increase in the temperature of the catalyzer which leads relatively quickly to the destruction thereof. In extreme cases, the catalyzer and therewith the entire vehicle can burst into flame. It is therefore important to detect misfires as soon as possible.

BACKGROUND OF THE INVENTION

Most methods for detecting misfires require for detection the signals of special sensors such as those sensors which measure ignition currents, measure the pressure or light in the combustion chamber or detect knocking signals. However, one generally strives to utilize as few sensors as possible. A sensor which is perforce present on every modern engine control is one which measures the crankshaft angle. It is therefore desirable to utilize signals from this sensor for as many purposes as possible and even for detecting misfires.

Published German patent application 3,615,547 discloses a method wherein the signals of the crankshaft sensor are used for detecting misfires. In this method, the crankshaft speed is measured toward the end of the compression angular segment for each cylinder and near the end of the following expansion angular segment. When misfires occur, the difference between the two detected speeds is considerably less than for a correctly operating engine. Accordingly, misfires are detected with the aid of the measured values for which the measured values must still be corrected for engine speed effects and averaged.

SUMMARY OF THE INVENTION

Notwithstanding the already known method for misfire detection, efforts continued to develop still more reliable methods than known heretofore especially while utilizing the signals of the crankshaft sensor.

The method of the invention for detecting misfires in an internal combustion engine having Z cylinders has the following features: a compression angular segment and an expansion angular segment are fixed for each cylinder (i) of the Z cylinders in accordance with an initial crankshaft angle and a crankshaft angle span corresponding to said cylinder so that with a smooth running of the engine and referred to time, a compression time span $TV(i)$ corresponding to said compression angular segment is essentially equal to an expansion time span $TE(i)$ corresponding to said expansion angular segment, with the compression angular segment lying within that crankshaft angle span for the cylinder (i) in which the engine speed drops because of compression operations and with the expansion angular segment lying within that crankshaft angle span for the cylinder (i) in which the engine speed increases because of expansion operations; and, deviations between compression time span and expansion time span for at least one cylinder are used to detect misfires.

This method affords the advantage that two time spans are applied for detecting misfires which are so determined that their difference should actually be zero for an engine running smoothly. This makes it possible to very reliably determine deviations from the smooth running conditions since deviations caused by rough running become much more manifest starting from a small difference value than starting from a large difference value as, for example, is present in the above-mentioned method where the difference between maximum and minimum speeds of the crankshaft is formed.

It is of still greater significance that with the above-mentioned time spans, a determination can be made as to whether rough running of the engine is caused only by misfires or if the rough running is caused alone by vibration and shaking (or jarring) forces or if the rough running is caused by vibration and shaking superposed with misfires with the vibration and shaking forces being transmitted to the engine. This constitutes a further embodiment of the invention.

The above-mentioned time spans can be processed in various ways, for example by: difference formation, sum formation, mean value formation or maximum value formation whereby combinations of variables can be set up which are either plausible or not plausible for a rough running engine condition which is caused only by misfires. In the case of implausibility, the sensitivity of the misfire detection is reduced since there may be no misfires or misfires with engine speed changes superposed thereon with the changes being caused by vibration forces or jarring forces. In this connection, it should be noted that vibration occurrences of long duration such as those caused by resonance of the drive chain as a rule do not lead to such great amplitudes with the detected values as misfires. For this reason, by reducing the sensitivity of the misfire detection it can be excluded that vibrations of this kind operate on the misfire detection. Large amplitudes can however, be caused by jarring forces which as a rule do not occur over a longer period of time with constant period. Furthermore, the effects of such forces on the evaluation can be reduced in that the detected values are averaged. If it is determined that rough running of the engine is not caused only by misfires, then an averaged time span can be increased to reduce the influence of the outside effects. This too corresponds to a reduction of the sensitivity of the misfire detection.

At this point it is noted that the misfire detection is a two-step process like every fault detection. First, a magnitude must be detected which is a measure for the fault which is here the misfire. Thereafter, the detected value is compared to a threshold. If the detected and possibly processed value exceeds the threshold value, then the presence of a fault is detected.

According to the above method, deviations between the compression time span and the expansion time span for at least one cylinder are used for misfire detection. This use can take place in only the first of the above-mentioned two steps or in the second step or even in both steps. If the measure is used in the first step, then the difference between the two time spans is formed which are set such that they are equal for a smooth running engine so that the difference must then be zero. The difference is therefore the value which is formed for misfire detection. If the deviations between the two above-mentioned time spans are used in the second step, then they serve to influence the comparison with the threshold in some kind of way which can be by influencing an averaging method dependent upon the detected values or it can be by means of a change of the threshold.

If the deviations between the two mentioned time spans are used in both steps, this affords the advantage that values can be used in the first step which are anyway required in the second step.

It is also possible not to use both the above-mentioned time spans in the first step and instead, to use only one of the time spans especially the compression time span. If one cylinder shows a misfire then not only does the expansion time span of this cylinder increase with respect to the compression time span lying directly thereahead but also, the compression time span measured for the cylinder next in succession in the ignition sequence is lengthened still further. Without ignition misfires, the compression time spans must be the same for two cylinders following one another in the ignition sequence. In the case of a misfire of the first of the two cylinders, however, the difference of the two compression time spans is approximately twice as great as the difference between the expansion time span and the compression time span of the first of the two cylinders by itself. Accordingly, the signal/noise ratio is improved when the difference between the compression time spans of two cylinders following one another in ignition sequence is detected in the first of the two steps. It is disadvantageous in this method that the difference formed in this manner is not very pronounced when detecting disturbances in addition to misfires so that this quantity is not as a rule necessary and therefore must be separately computed for the first step.

It is here noted that an engine never runs continuously with a completely constant engine speed, not even when it runs without misfires and without other disturbances. Rather, the engine speed falls somewhat with each compression angular segment for a cylinder and increases again with the expansion angular segment which follows. This fluctuation of engine speed repeats for each cylinder. Engine running with these slight engine speed fluctuations, which are conditioned by the function of the engine, is identified hereinafter as smooth engine running. On the other hand, rough engine running is that kind of operation wherein larger speed fluctuations occur because of any one of the following: misfires, oscillations of the drive chain or jarring forces which are transmitted from the roadway.

As was explained above, since the engine speed continuously changes periodically, the same time durations of compression time span and expansion time span can be adjusted in different ways. Thus, the crankshaft angle segments within which these time spans are measured can be varied according to initial crankshaft angle and/or crankshaft angle duration. For a four-cylinder four-stroke engine, it is because of synchronization reasons the simplest to select for the compression angular segment as well as for the expansion angular segment in each case 90° crankshaft angles so that the compression angular segments and the expansion angular segments follow each other in an uninterrupted sequence. It is then only necessary to fix the start crankshaft angle such that the time spans for the two segments are the same. This determination can for example take place on a test stand. If the four-stroke engine has more than four cylinders, then the overlap of the different work segments in different cylinders must be considered. Depending upon the particular engine on which the method is practiced, it can therefore be advantageous to not allow the angular segments to follow one directly upon the other but instead be fixed separately from each other.

BRIEF DESCRIPTION OF THE DRAWINGS

The invention will now be described with reference to the drawings wherein:

FIG 1a is a schematic representation of the engine speed plotted against crankshaft angle KW;

FIG. 1b shows a continuous count of work segments (k) as they correspond to the crankshaft angle KW in FIG. 1a;

FIG. 1c corresponds to FIG. 1b but for cylinders (i) following each other in the ignition sequence;

FIG. 1d corresponds to FIG. 1b but for the work cycles (j);

FIG. 1e is a schematic representation of the time duration T(k) of sequential segments in the schematic of FIG. 1a;

DESCRIPTION OF THE PREFERRED EMBODIMENTS OF THE INVENTION

In FIG. 1a, the engine speed (n) as a function of crankshaft angle KW is plotted over two work cycles j=1 and j=2 (see FIG. 1d). The end of each work cycle is shown in FIG. 1a by means of a perpendicular solid line. The curve traced in FIG. 1a applies to a four-cylinder four-stroke engine. Each work cycle (j) is therefore subdivided into four time spans for the individual cylinders (i) as shown in FIG. 1c and which is indicated in FIG. 1a by the dashed lines. The cylinder numbering takes place here and in the following in correspondence to the chronological ignition sequence. A compression angular segment V takes place in advance of each ignition and an expansion segment E takes place after each ignition. The compression angular segment and the expansion angular segment for a particular cylinder are separated from each other by respective dotted lines. For each work cycle (j) there are correspondingly a total of eight segments k=1-8 present as shown in FIG. 1b.

When the engine runs smoothly as applicable up to the second cylinder from the left, the engine speed increases and drops periodically in narrow limits. During each compression angular segment V, the engine speed becomes less while the engine speed increases in the following expansion angular segment E. In the embodiment shown, both crankshaft angular segments are of equal length and each extend over 90° crankshaft angle. The initial angle is so positioned that with reference to time, the two segments are also of the same length so that the compression time span TV(i) corresponding to a compression angular segment V essentially is the same as an expansion time segment TE(i) corresponding to an expansion angular segment E. These time spans T(k) for the individual segments are shown in FIG. 1e and are shown sequentially for the individual segments (k).

Figure 1:
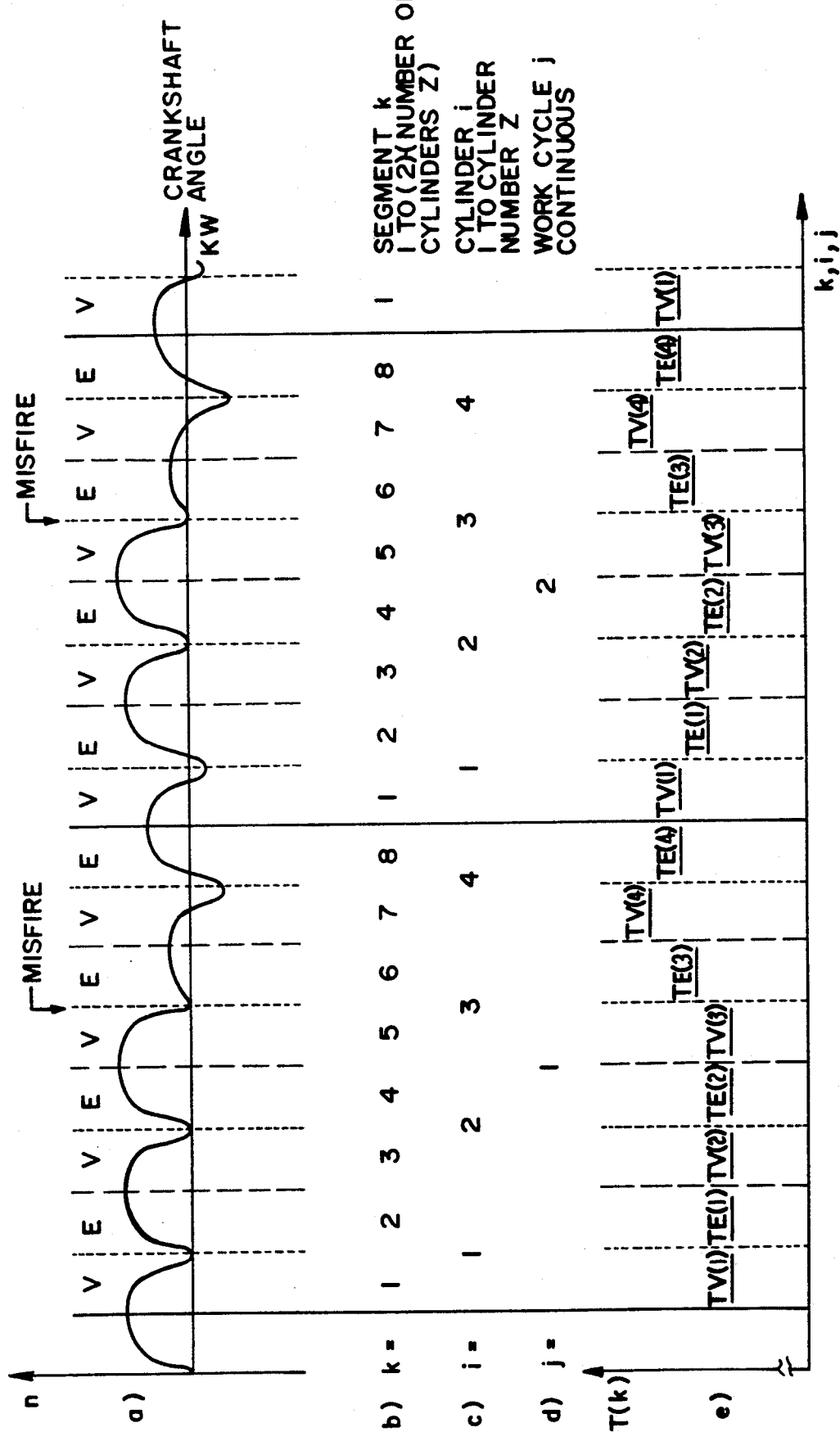

In FIG. 1, the assumption is made that the cylinder i=3 has misfires. This has as a consequence that after the drop in engine speed (n) during the compression time span of this cylinder, the engine speed no longer increases in the following expansion time span to the old maximum value; instead, the engine speed increases only slightly with respect to the minimum at the end of the compression time span. An increase still takes place since the compressed fuel/air mixture expands. However, since the old maximum engine speed is no longer reached, the same time span is no longer needed for the expansion angular segment E of the third cylinder as for the compression angular segment V; instead, the time span is greater. This is shown in FIG. 1e where the expansion span TE(3) lies higher than the compression time span TV(3). In the following compression angular segment for the fourth cylinder, the engine speed drops still further and for this reason the compression time span TV(4) for this cylinder is especially long. Only in the expansion angular segment of the fourth cylinder, does an acceleration take place and for this reason, the expansion time span TE(4) is less than the compression time span TV(4). The following compression time span TV(1) for the first cylinder corresponds again approximately to the preceding expansion time span, that is, the time span TE(4). With the expansion time span TE(2) for the second cylinder, the equilibrium value is again reached as it would apply for the smooth running engine condition. The same time period applies also for the following compression time span TV(3) of the third cylinder since in this cylinder, the misfire in the third cylinder has not yet had its effect. Only in the next expansion time span TE(3) does the misfire again become effective whereupon the sequence described here repeats.

The following differences can be formed with the above-mentioned time spans:

$$DTE(i)V(i) = TE(i) - TV(i) \quad (A)$$

$$DTV(i+1)E(i) = TV(i+1) - TE(i) \quad (B)$$

As the difference DIFF(i) the quantity can be used in accordance with equation (A):

$$DIFF(i) = DTE(i)V(i) \quad (C1)$$

However, the sum of two sequential difference time spans is still greater, that is, the following value for DIFF(i):

$$\begin{aligned} DIFF(i) &= DTE(i)V(i) + DTV(i+1)E(i) \\ &= TV(i+1) - TV(i) \end{aligned} \quad (C2)$$

From FIG. 1, the following becomes apparent:
(a) the value DIFF(i) of equation (C1) is zero when no misfires are present; however, greater than zero for the case where misfires are present;
(b) the value DIFF(i) of equation (C2) is equal to zero if no misfires are present; however, in contrast, this value is greater than zero in the case of misfires and even greater than the value DIFF(i) according to equation (C1) and for this reason, this value permits a better signal/noise ratio for detecting misfires;
(c) if the difference DTV(i)V(i)>0 then, if this deviation from zero is caused by a misfire, also the value DTV(i+1)E(i)>0. If this is not the case, then there is either no misfire or there is a misfire with further disturbances superposed thereon. In this case, the sensitivity of the misfire detection should be reduced.

When the measured time spans are processed in still another way, further quantities can be formed which can be checked with respect to plausibility as to whether only misfires or disturbances are present with the disturbances perhaps being superposed with misfires. This is described further below with respect to FIG. 5. In the following, overall method sequences which use the observations described above are explained with respect to the block circuit diagrams of FIGS. 2 to 4. The blocks of FIGS. 2 to 4 will be explained in sequence with the center portion of the method either being formed by the variant of FIG. 3a or the variant of FIG. 3b.

Figure 2:
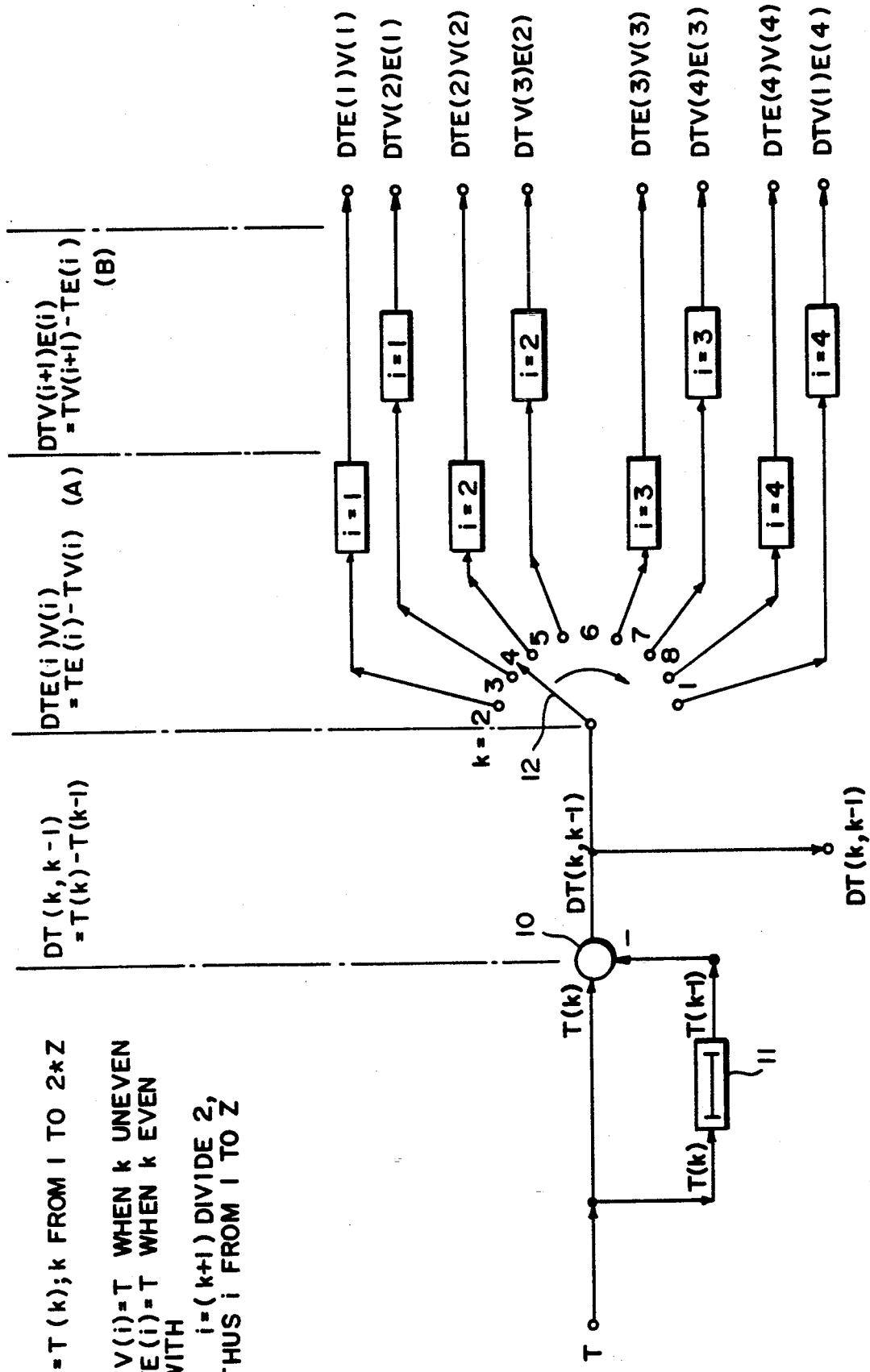
FIG. 2 is a block circuit diagram for explaining how differences of segment time spans are obtained for further processing.

FIG. 2 shows the formation of values according to the above equations (A) and (B). A time span value T(k) shown in FIG. 1e and the segment time span value T(k−1) are supplied to a summing component 10 with the segment time span value T(k−1) being delayed with respect to the time span value T(k) by one segment with the aid of a delay element 11. This difference DT(k, k−1) is either the value according to equation (A) or according to equation (B) in dependence upon whether (k) is even or uneven. The values are provided by a multiplexer 12 to eight output terminals, that is, one output terminal for each segment.

Figure 3B:
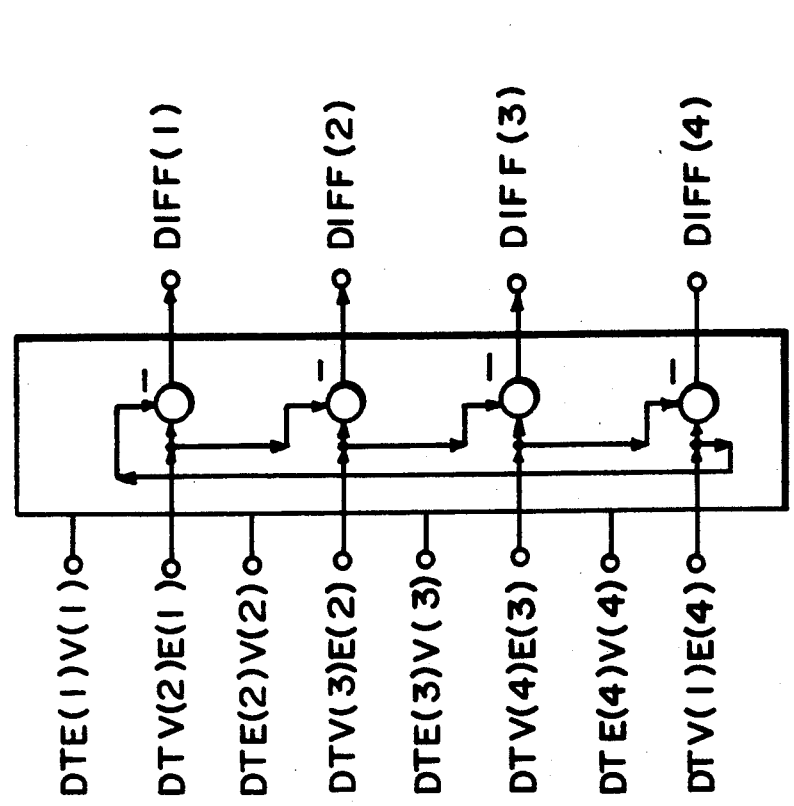
FIG. 3b is a block circuit diagram corresponding to FIG. 3a but with a different difference formation.
Figure 3A:
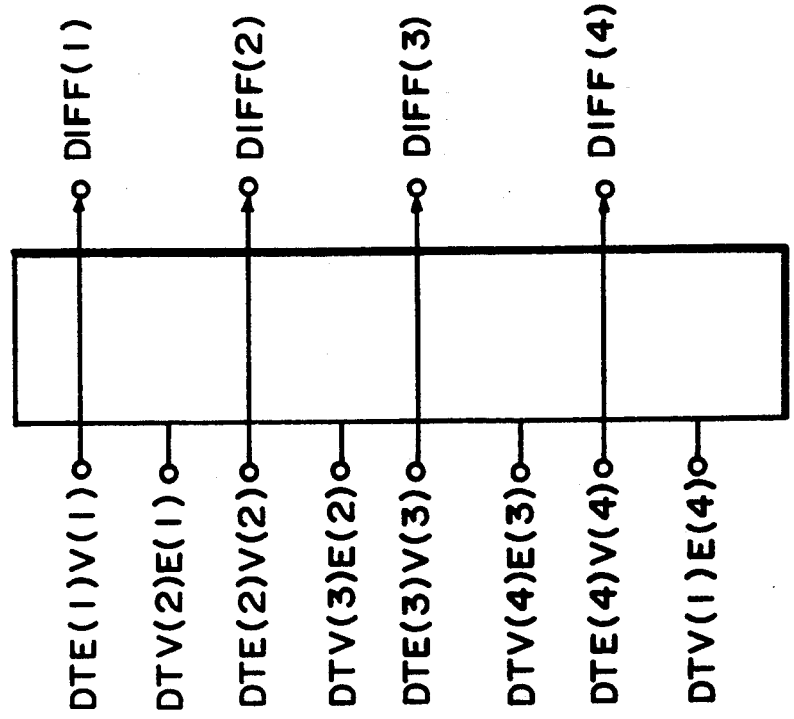
FIG. 3a is a block circuit diagram for showing how differences from the difference time spans are formed for further processing which were obtained with the aid of the method shown in FIG. 2.

FIGS. 3a and 3b show operations as they occur when carrying out the above equations (C1) and (C2), respectively. According to equation (C1), the difference values DT(i)V(i) are supplied unchanged as difference values DIFF(i) as shown in FIG. 3a. The block diagram of FIG. 4 includes four summing points 13.1 to 13.4 for evaluating equation (C2), that is, one summation point for each of the four cylinders. There, the sums are computed from the values DTE(i)V(i) and DTV(i+1)E(i) computed in the block diagram of FIG. 2 in order to obtain the particular difference values DIFF(i). In lieu thereof, the difference values can also be computed directly as $TV(i+1) - TV(i)$. This can take place as the computation of the value DT(k, k−1) in FIG. 2; however, with a delay component which delays by two segments for the reason that every other segment is a compression angular segment.

The values DIFF(i) can be directly compared to a threshold value SW(n, L) having an actual value dependent upon the particular actual values of engine speed (n) and any load-dependent quantity L. It is advantageous to have this threshold value include acceleration and deceleration effects. As soon as one of the difference values DIFF(i) exceeds the threshold value SW(n, L), this would be the indication that a misfire is present in the corresponding cylinder (i).

However, it is more advantageous to process the difference values DIFF(i) further before the threshold value comparison takes place. The considerations under which the modifications can take place are shown with the aid of the block diagram of FIG. 4.

It is directly recognizable that the differences between the time spans of adjacent segments are unequal to zero not only in cases of misfires, vibrations or jarring but also in the case of accelerations and decelerations. To compensate for the last-mentioned effects, it is advantageous to subtract a corrective value BVK from the computed difference value which corrective value BVK is dependent upon acceleration and deceleration in the same manner as one of the above-mentioned difference values. For example, the sum of the differences $DIFF(i)=TV(i+1)-TV(i)$ divided by four for the four cylinders in a work cycle (j) can be computed. In this way, the mean engine speed change over the entire work cycle can be used for correction and instantaneous changes such as those changes caused by misfires or jarring can best be suppressed. In a case of only a misfire, this quantity is zero and is in contrast positive for accelerations and negative for decelerations. The computation is as follows:

$$BVK = \frac{1}{Z} \sum_{i+1}^{Z} DIFF(i) \tag{D}$$

The corrective quantity BVK for correcting effects which are caused by accelerations or decelerations is subtracted from the differences DIFF(i) which can take place at the particular summing points 14.1 to 14.4 for the values of the four cylinders.

It is also advantageous to consider the influence of the engine speed on the difference values in advance of the threshold value comparison. This is so because it is recommended to carry out averaging. However, if the measured values are averaged and in contrast threshold values are used which are dependent on the particular actual value of engine speed (n), then the threshold value changes with an engine speed change faster than the averaged comparison value if the latter has not already had an engine speed correction. For correcting for engine speed, it is sufficient to divide the difference value (corrected by the value BVK) by one of the time spans which have been detected, for example, by the particular deceleration time span TV(i). The following then applies for the engine speed correction values nK:

$$nK = TV(i) \tag{E}$$

In the division positions 15.1 to 15.4 in the block diagram according to FIG. 4, the following misfire detection value DTAE(i) is computed as follows:

$$DTAE(i)=(DIFF(i)-BVK)/nK \tag{F}$$

The correction of the engine speed error would be still better if the division would be by a quantity dependent upon the second or third power of the time, for example by $TV^2$ or $TV^3(i)$. However, in practice, it has been shown that this computation effort is not necessary.

With the difference values corrected in this manner, a mean value formation could take place directly with a threshold value comparison which already provides reliable values for the misfire detection. The mean value formation with threshold value detection can take place either in that the values DTAE(i) are compared directly to a threshold value and misfires detected when, within a pregiven angle span, the threshold is more often exceeded than a pregiven number or in that the values DTAE(i) are glidingly averaged and the mean value formed in this manner is compared to a threshold value.

Figure 4:
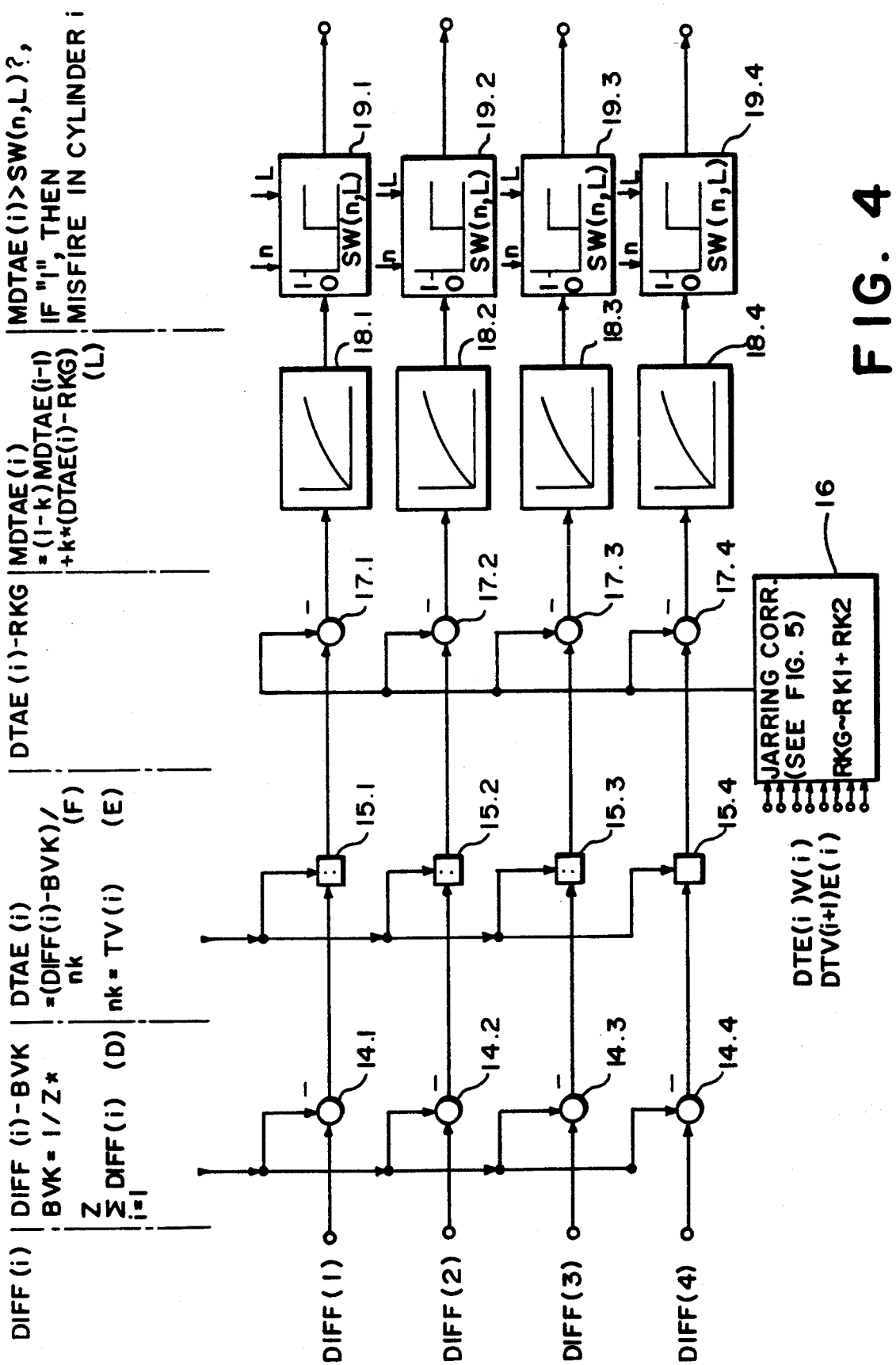
FIG. 4 is a block circuit diagram for showing how a misfire detection with disturbance effect detection can be carried out with the aid of difference values with the differences being formed according to one of the methods as shown in FIGS. 3a and 3b; and, FIG. 5 is a schematic for showing how disturbance effects (vibrations, jarring) can be detected in addition to misfires.

In the embodiment of FIG. 4 however, a so-called jarring correction takes place in advance of the threshold value comparison with mean value formation. A jarring correction total value RKG is supplied in a jarring correction block 16 and supplied to summation locations 17.1 to 17.4 where the jarring correction total value RKG is subtracted from the misfire detection values DTAE(i).

Figure 5:
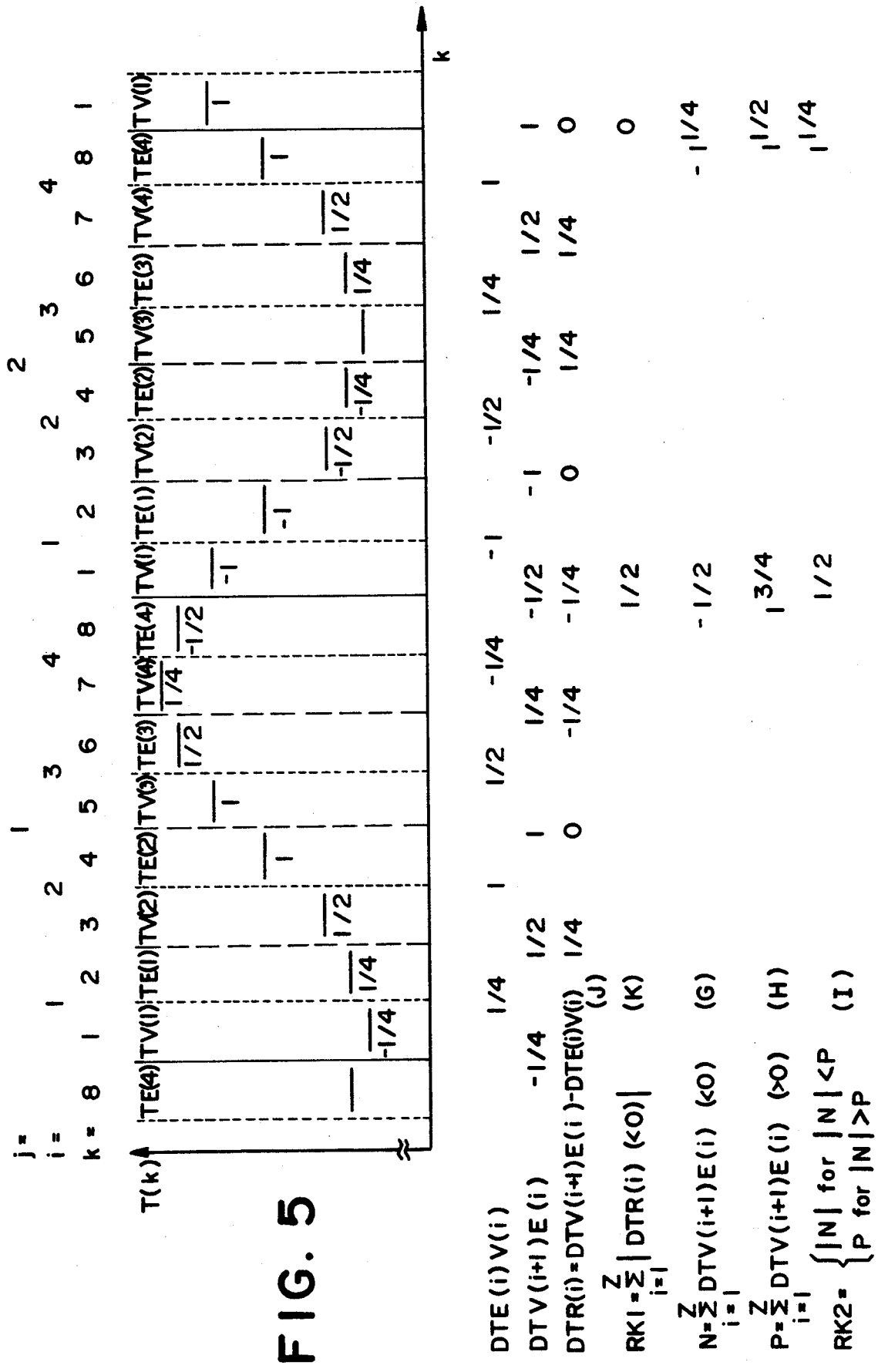

An explanation will now be provided with reference to FIG. 5 as to how the jarring correction total value RKG is computed for the embodiment of the invention.

FIG. 5 corresponds to FIG. 1e and shows values of time spans over the continuously numbered sequential segments, that is, a compression angular segment and an expansion angular segment for each of the four cylinders. The work cycles (j) are again separated from each other by solid lines and the values for sequential cylinders are separated from each other by dashed lines and the two time spans for each of the cylinders are separated from each other by dotted lines. The assumption is made that a vibration is present having a period duration which corresponds to one and one half times the duration of the work cycle (j). The difference between sequential segment time spans is measured in random units. The largest difference is assigned the value 1. In the embodiment, the sequential differences are assigned the values $\frac{1}{4}, \frac{1}{2}, 1, 1, \frac{1}{2}, \frac{1}{4}, -\frac{1}{4}, -\frac{1}{2}, -1, -1, -\frac{1}{2}, -\frac{1}{4}$ and then again $\frac{1}{4}, \frac{1}{2}$ and so on. It can be seen that with an increase of the time spans, similar sequential difference values occur as in the case of misfires in FIG. 1e; however, significant differences occur when the time spans are shortened. Accordingly, in the case of a misfire, the difference DTE(i)V(i) for the misfiring cylinder and the difference DTV(i+1)E(i) for the following cylinder are in a specific ratio or are essentially equal {see for example in FIG. 1: DTE(3)V(3) and DTV(4)E(3)}; however, in a case of a vibration or for jarring other differences between the time spans can exist. The differences DTR(i) of these time spans are formed in accordance with equation (J) of FIG. 5. According to equation (K), the sum of the amounts of the negative difference values is formed for each work cycle (j), whereby a first jarring correction factor RK1 is obtained. This first jarring correction factor RK1 can only then have a value greater than zero when vibration effects or jarring effects alone or together with misfire effects are present. If outside effects are determined in this manner, then the misfire detection can be completely inhibited. In the embodiment shown, the value of the quantity RK1 is however absorbed in the jarring correction total value RKG which is subtracted from the misfire detection values DTAE(i).

It is now noted that the particular actual value of RK1 must not necessarily be computed at the end of each work cycle (j); instead, this value can be computed continuously for each cylinder from the values of the particular last Z cylinders (Z=number of cylinders of the engine). It is also possible to average the value or to determine the value over a larger number of cylinders or work cycles so that not with each cycle different values are subtracted which would be the case if the value RK1 of FIG. 5 would be used as such for each work cycle (j). Such differences are averaged automatically by the filter components 18.1 to 18.4 described below. As shown, the quantity RK1 at the end of the first work cycle has the value $-\frac{1}{2}$ whereas, at the end of the second work cycle, the quantity RK1 has the value zero. This shows that a mean value formation is recommended.

Not only misfires are then present with certainty if, as explained above, the value DTV(i+1)E(i) is less than zero although the value DTE(i)V(i) was greater than zero. Even a violation of this plausibility condition can be used to switch off the misfire detection or to reduce the same in its sensitivity. If no corrective value is computed, then a fixed corrective value is subtracted from the misfire detection values DTAE(i) or the threshold value SW can be increased.

In FIG. 5, three further quantities N, P and RK2 are shown which are likewise computed from the equations (G), (H) and (I), respectively, as shown in FIG. 5. N is then the sum of the negative values of DTV(i+1)E(i); whereas, P is the sum of corresponding positive values for the four cylinders in a work cycle. Here too, the summation can again take place continuously for each cylinder from the values for the particular last Z cylinder. If as a value for N, a value less than zero or less than a negative threshold value is obtained, and if P is greater than zero, this is an indication that either no misfires occur or misfires are present on which other disturbances have been superposed.

By preparing a drawing of numerous time span patterns corresponding to the vibration pattern of FIG. 5 for vibrations having different periods, for different jarring patterns also superposed with different misfire patterns, for misfires in only one cylinder or in several cylinders (either in cylinders which follow each other sequentially or which are separated from each other), a determination is made that a further quantity which includes the extent of jarring or of vibrations can be detected which is the quantity RK2 of equation (I) of FIG. 5. This is the maximum value of the amounts of the values N and P.

As shown in the jarring correction block 16 in FIG. 4, the value RKG is a value proportional to the sum of values RK1 and RK2.

A low pass 18.1 to 18.4 follows after each of the addition positions 17.1 to 17.4, respectively, wherein the value of the quantity RKG is subtracted from the particular misfire detection value DTAE(i). In the low pass, the corrected detection quantity is filtered by the conventional filter equation of the first order as shown in equation (L) in FIG. 4. However, in lieu thereof, any desired other mean value formation can take place. The mean value formation can be carried out especially simply with the aid of the low pass equation of the first order; the mean value formation further automatically averages out fluctuations of the jarring correction value. The mean values MDTAE(i) obtained for the four cylinders are compared in comparators 19.1 to 19.4 with the threshold value SW(n, L) explained above. For each cylinder (i) for which the corresponding mean value MDTAE(i) exceeds the threshold value SW(n, L), it is assumed that misfires are present. The injection of fuel into these cylinders is then discontinued.

In practice, the case can occur in which the jarring correction is relatively pronounced which would then lead to the condition that the threshold value would not be exceeded even though misfires are present. It is then advisable to compare the jarring correction values for the different cylinders to each other. If all jarring correction values are equally high, this indicates that the high values are conditioned by disturbances other than misfires. In contrast, if one individual value is especially high, then the injection of fuel into the particular cylinder can be interrupted as part of an investigative effort. If it develops that all values remain essentially unchanged, this is an indication that misfires actually occurred in this cylinder. If the values change, then the injection is again resumed.

It is emphasized once more that it is essential for the methods that a compression angular segment and an expansion angular segment for each cylinder are so fixed that the corresponding time spans are equal for a smooth engine running. If deviations occur in the time spans, then these differences can be used directly for computing detection values for misfires and/or detection values can be corrected with jarring correction values which were determined with the aid of the differences. In the last case, it is always important to use plausibility criteria with reference to misfires. Basic and simple plausibility criteria are mentioned in the above description. The plausibility criteria can however be configured to be very complex such as with the use of autocorrelative methods.

It is understood that the foregoing description is that of the preferred embodiments of the invention and that various changes and modifications may be made thereto without departing from the spirit and scope of the invention as defined in the appended claims.

What is claimed is:

1. A method for detecting misfires in an internal combustion engine having Z cylinders, the method comprising the steps of:

fixing a compression angular segment and an expansion angular segment for each cylinder (i) of the Z cylinders in accordance with an initial crankshaft angle and a crankshaft angle span corresponding to said cylinder so that, with a smooth running of the engine and referred to time, a compression time span TV(i) corresponding to said compression angular segment is essentially equal to an expansion time span TE(i) corresponding to said expansion angular segment, with the compression angular segment lying within that crankshaft angle span for the cylinder (i) in which the engine speed drops because of compression occurrences and with the expansion angular segment lying within that crankshaft angle span for the cylinder (i) in which the engine speed increases because of expansion occurrences; and, utilizing deviations between compression time span and expansion time span for at least one cylinder to detect misfires.

2. The method of claim 1, wherein a corrective time span BVK is subtracted from each of the time spans to consider time span changes caused by accelerations or decelerations.

3. The method of claim 1, wherein the time spans are divided by an engine-speed dependent corrective quantity nK for considering the engine speed range on the time spans.

4. The method of claim 1, wherein an investigation is made to determine if values of compression time spans and expansion time spans, which values deviate from each other for a rough running of the engine caused only by misfires, are plausible; and, if not plausible, the sensitivity of the misfire detection is reduced.

5. The method of claim 4, wherein the presence of a rough running condition of the engine caused only by misfires is negated when the value:

$$DTV(i+1)E(i) = TV(i+1) - TE(i) < 0$$

although the value $$DTE(i)V(i) = TE(i) - TV(i) > 0.$$

6. The method of claim 5, wherein the value $$RK1 = \sum_{i+1}^{Z} |DTV(i+1)E(i), \text{ when this difference} < 0|$$

is formed for use to reduce the sensitivity of the misfire detection.

7. The method of claim 6, wherein the value:

$$N = \sum_{i+1}^{Z} DTV(i+1)E(i), \text{ when} < 0$$

is formed, and, when this value is less than a negative threshold value or is equal to zero, the condition is negated that the running of the engine is only influenced by misfires.

8. The method of claim 7, wherein the value:

$$RK2 = \begin{cases} |N| & \text{for } |N| < P \\ P & \text{for } |N| > P \end{cases}$$

is formed for use when the sensitivity of the misfire detection is present with $$P = \sum_{i=1}^{Z} DTV(i+1)E(i), \text{ when} > 0.$$

9. The method of claim 1, wherein the difference values:

$$DIFF(i) = TE(i) - TV(i)$$

are repeatedly formed for each cylinder and misfires are detected when a quantity formed with the difference values fulfills a threshold condition.

10. The method of claim 1, wherein the difference values:

$$DIFF(i) = TV(i+1) - TV(i)$$

are formed repeatedly for each cylinder and misfires are detected when a quantity formed with these difference values fulfills a threshold condition.

* * * * *